US009286309B2

(12) United States Patent
Goel et al.

(10) Patent No.: US 9,286,309 B2
(45) Date of Patent: Mar. 15, 2016

(54) REPRESENTATION OF LAST VIEWED OR LAST MODIFIED PORTION OF A DOCUMENT

(75) Inventors: Naveen Goel, Noida (IN); Rekha Agarwal, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1409 days.

(21) Appl. No.: 11/752,918

(22) Filed: May 23, 2007

(65) Prior Publication Data

US 2013/0124955 A1    May 16, 2013

(51) Int. Cl.
| | | |
|---|---|---|
| G06F 17/00 | (2006.01) | |
| G06F 17/30 | (2006.01) | |
| G06F 3/0481 | (2013.01) | |
| G06F 3/0488 | (2013.01) | |
| G06F 17/21 | (2006.01) | |
| G06F 17/24 | (2006.01) | |
| G06F 17/22 | (2006.01) | |
| G06F 3/0487 | (2013.01) | |

(52) U.S. Cl.
CPC ........ *G06F 17/30126* (2013.01); *G06F 3/0481* (2013.01); *G06F 3/0487* (2013.01); *G06F 3/0488* (2013.01); *G06F 3/04815* (2013.01); *G06F 17/212* (2013.01); *G06F 17/2247* (2013.01); *G06F 17/24* (2013.01); *G06F 17/3089* (2013.01); *G06F 17/30899* (2013.01)

(58) Field of Classification Search
CPC ............ G06F 17/30126; G06F 3/0481; G06F 3/0488; G06F 3/0487; G06F 3/04815; G06F 17/30011; G06F 17/3089; G06F 17/2247; G06F 17/24; G06F 17/212; G06F 17/30899
USPC ......... 715/838, 204, 255, 273, 775, 815, 771, 715/762–768
See application file for complete search history.

(56) References Cited

U.S. PATENT DOCUMENTS

| | | | |
|---|---|---|---|
| 5,625,833 A | 4/1997 | Levine et al. | |
| 5,819,301 A * | 10/1998 | Rowe et al. | 715/235 |
| 5,995,101 A | 11/1999 | Clark et al. | |
| 6,272,484 B1 | 8/2001 | Martin et al. | |
| 6,486,892 B1 * | 11/2002 | Stern | 715/760 |
| 6,496,206 B1 | 12/2002 | Mernyk et al. | |
| 6,563,514 B1 | 5/2003 | Samar | |
| 6,701,454 B1 * | 3/2004 | Fischer et al. | 714/15 |
| 6,738,973 B1 * | 5/2004 | Rekimoto | 718/104 |
| 6,883,138 B2 | 4/2005 | Rosenholtz et al. | |
| 7,434,207 B2 | 10/2008 | Spencer | |
| 7,574,591 B2 | 8/2009 | Downer et al. | |
| 7,594,187 B2 * | 9/2009 | Baird | G06F 17/30882 715/747 |
| 7,657,582 B1 * | 2/2010 | Cram et al. | 707/640 |
| 7,797,337 B2 | 9/2010 | Fry | |
| 7,827,503 B2 | 11/2010 | Jang | |
| 7,895,531 B2 | 2/2011 | Radtke et al. | |

(Continued)

OTHER PUBLICATIONS

Douglis, et al., "The AT&T Internet Difference Engine: Tracking and Viewing Changes on the Web", World Wide Web, vol. 1, issue 1, pp. 27-44 (1998).

*Primary Examiner* — Quoc A Tran
(74) *Attorney, Agent, or Firm* — Finch & Maloney PLLC

(57) ABSTRACT

A method, system, and computer program product for storing the settings of a last edited page or a last viewed page of a document and preprocessing the document to generate a thumbnail of the document. In an embodiment of the invention, the thumbnail comprises a representation of the last edited page or last viewed page of the document.

22 Claims, 5 Drawing Sheets

(56) References Cited

U.S. PATENT DOCUMENTS

| | | |
|---|---|---|
| 7,913,185 B1 | 3/2011 | Benson et al. |
| 7,975,019 B1 | 7/2011 | Green et al. |
| 7,975,020 B1 | 7/2011 | Green et al. |
| 8,108,371 B2 | 1/2012 | Dharmarajan et al. |
| 2002/0129051 A1 | 9/2002 | Abdelhadi et al. |
| 2003/0210281 A1* | 11/2003 | Ellis et al. .................... 345/838 |
| 2004/0003352 A1* | 1/2004 | Bargeron et al. ............. 715/530 |
| 2004/0125149 A1 | 7/2004 | Lapidous |
| 2004/0141016 A1 | 7/2004 | Fukatsu et al. |
| 2004/0205633 A1 | 10/2004 | Martinez et al. |
| 2005/0096979 A1 | 5/2005 | Koningstein |
| 2005/0096980 A1 | 5/2005 | Koningstein |
| 2005/0154997 A1 | 7/2005 | Brun-Cottan et al. |
| 2005/0210416 A1* | 9/2005 | MacLaurin et al. .......... 715/851 |
| 2005/0216856 A1 | 9/2005 | Matti |
| 2006/0020899 A1* | 1/2006 | Gusmorino et al. .......... 715/765 |
| 2006/0036568 A1* | 2/2006 | Moore et al. ...................... 707/1 |
| 2006/0069670 A1 | 3/2006 | Khaliq et al. |
| 2006/0143568 A1 | 6/2006 | Milener et al. |
| 2006/0282416 A1 | 12/2006 | Gross et al. |
| 2007/0011622 A1* | 1/2007 | Chae et al. .................... 715/764 |
| 2008/0034325 A1* | 2/2008 | Ording .......................... 715/838 |
| 2008/0034329 A1 | 2/2008 | Posner et al. |
| 2009/0064024 A1* | 3/2009 | Horvitz et al. ................ 715/771 |
| 2011/0087976 A1* | 4/2011 | Cisler et al. .................. 715/762 |
| 2013/0073948 A1* | 3/2013 | Bryar et al. ................... 715/234 |

* cited by examiner

REPRESENTATION OF LAST VIEWED OR LAST MODIFIED PORTION OF A DOCUMENT

1. TECHNICAL FIELD

Embodiments of the invention relate to generating and storing information related to last viewed or modified portions of documents.

2. BACKGROUND

A last viewed view of a document refers to the section of the document (or portion) that was viewable to a user in the application's window when he/she closed the document (or quit the application.) It can be either one particular page, two partial pages or may comprise of more than two pages if the document is being viewed in a zoomed-out mode. This view will depend upon the application window's dimensions (for example, the user may have opened the application in compact mode or full mode or may have resized to some other size).

A last modified/edited view refers to the document section (or portion) that was viewable to user in the application's window when he/she made the last set of changes to the document. As in the case of last viewed view, it can be one particular page, two partial pages or more than two pages. This view will also depend upon the application window dimensions (for example, user may have opened the application in compact mode or full mode or may have resized to any other size).

Existing techniques, in the thumbnail view of a file browser or explorer, display a thumbnail of the first page of the document or merely a preview of the document file entry icon. Further if user hovers mouse cursor over this thumbnail, only a limited amount of information, for example, type, title, modified date and size are viewable. Under existing techniques, it is difficult for a user to discern without expending an enormous amount of time as to which document he/she last reviewed. Further under existing techniques, it is extremely tedious to discern the changes or modifications that he or she made to the document without actually opening the document.

In instances where a document editing application suddenly crashed or abruptly ended due to power failure or some other reason, its difficult for the editor to just view the document file entry icon and determine whether or not their last set of changes were successfully saved.

Lastly, even upon opening the document, information regarding the last modification/change to the document cannot be easily determined because in most instances the document will open at the very beginning of the first page. This by itself is not very useful since the first page of the document may not be the one that the document editor last edited or modified or viewed. In certain other instances, the document editor is required to explicitly setup preferences of the application such that the document reopens to last viewed page for all files. However, even in these cases, an evident and easily discoverable way to instruct document editing application to remember the last modified view is lacking.

Thus, there remains a need for a way to provide a pictorial/thumbnail representation of the last viewed view of a document or a last edited view of a document so that a user may discern the last viewed view or last edited view of a document without actually opening the document.

SUMMARY

Embodiments of the invention described herein provide a method, system and a computer program product for generating a thumbnail of the document, such thumbnail comprising a representation of the last edited or last viewed page of the document.

In one embodiment, a thumbnail of the document so generated which is representative of the last viewed or last edited view of the document, is stored. Such a thumbnail may be displayed in response to an input.

Embodiments of the invention help generate and store user-specific thumbnails which reflect the last viewed view or last edited view of individual users. This is particularly helpful in instances of multi-media authoring tools involving joint editors.

Other embodiments may be used in products such as Version Cue® and Adobe® Bridge.

This summary is not intended to describe each embodiment of the invention. The Detailed Description and Figures that follow provide additional aspects of embodiments of the invention.

DETAILED DESCRIPTION OF EMBODIMENTS

Figure 1:
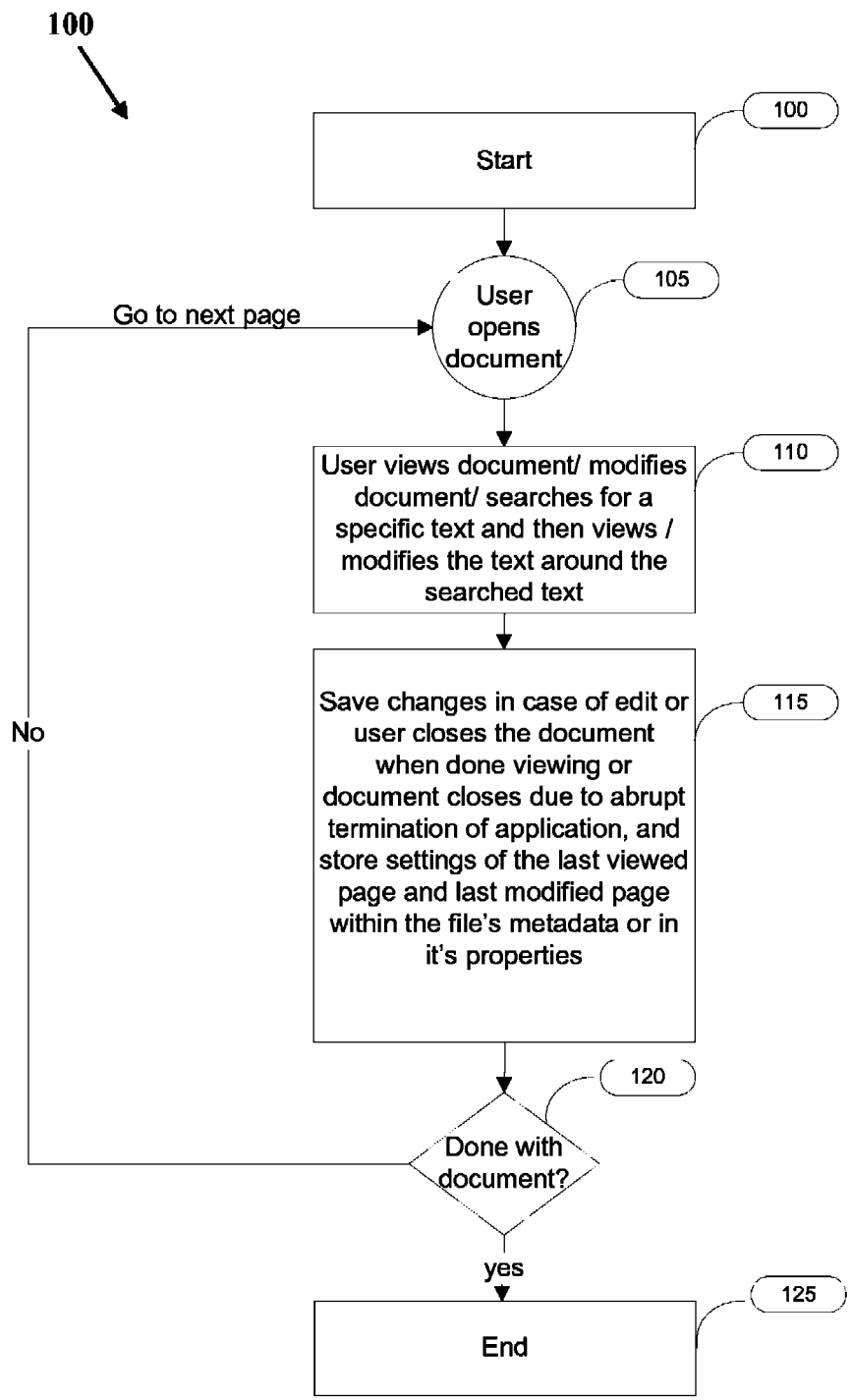
FIG. 1 is an illustration of an embodiment of the invention.
Figure 2:
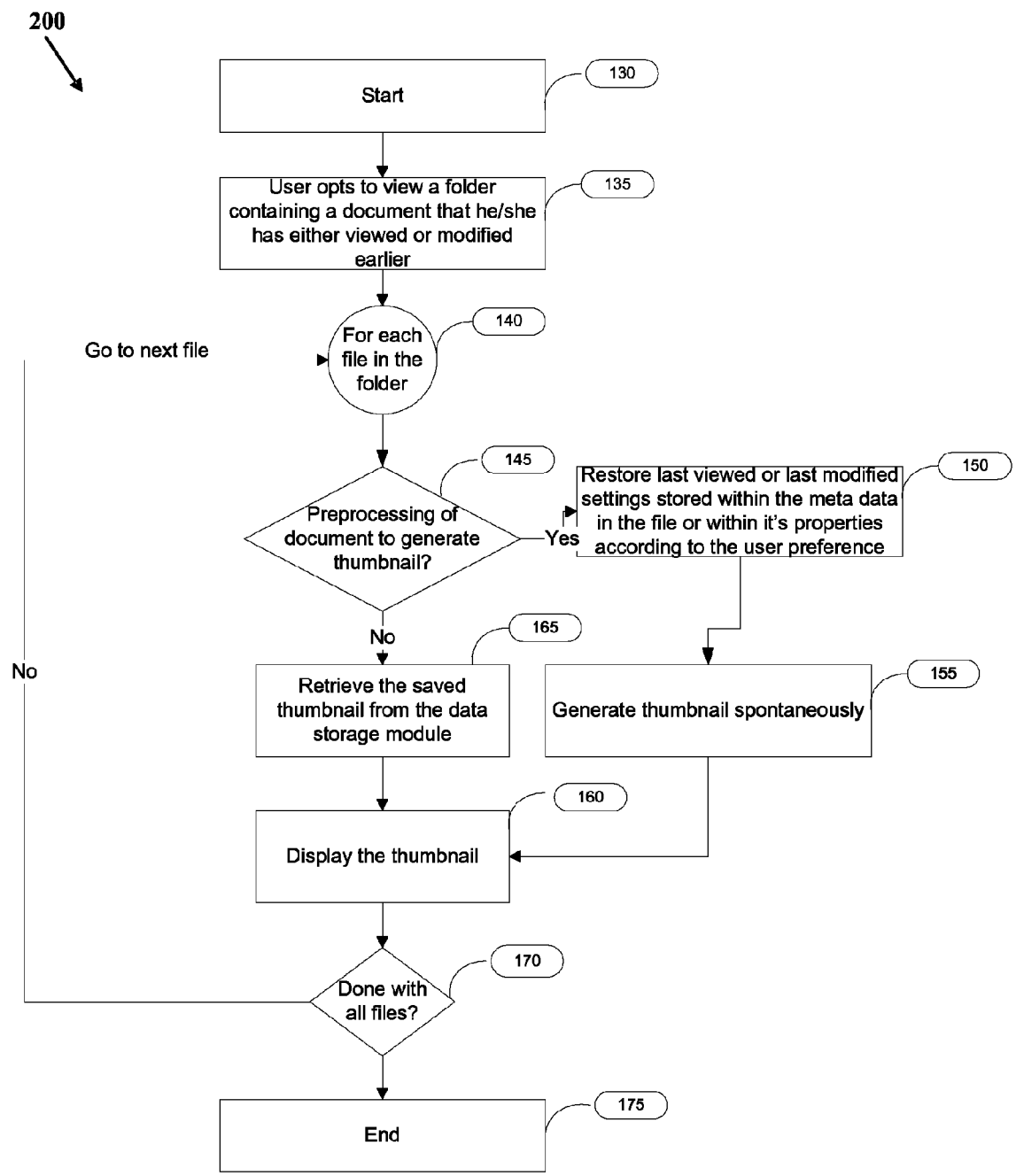
FIG. 2 is an illustration of an embodiment of the invention.

FIG. 1 is an illustration of an embodiment 100 of the invention. In step 100, the process starts. User opens a document in step 105. In step 110, user views or modifies/edits the document or searches for a specific text and then views or modifies the text around the searched text. In step 115, when the user is done viewing a document and exits the application or when the application abruptly terminates, the settings of last modified or last viewed page is stored within the file's metadata or in its properties. In one embodiment of the invention, depending upon user specified file explorer setting, either the settings of last modified page or last viewed page is restored to generate thumbnails as shown in FIG. 2.

In an alternative embodiment of the invention, the settings of both last modified view and last edited view are stored periodically within the files metadata or in its properties and, according to the user preference (i.e. whether the user wants to view last modified page or last viewed page) either the settings of the last modified page or the last viewed page is restored and respective thumbnails are generated. In one embodiment of the invention, the settings of the last viewed page or the last modified page is stored as user-specific metadata such that, multiple users logged in at different times on the same machine and browsing the same folder will see different thumbnails for the documents that they had opened/viewed/modified.

In an embodiment of the invention, the metadata will store information, including a content start offset/marker in the document file—referring to the start of the last view and size (or duration) of the last view buffer—to be able to create an exact thumbnail of the last view (even taking into consideration application window dimensions.)

In an alternative embodiment of the invention, this information can be stored via any associated mechanism (system registry, or associated files in the same folder like sidecar files for XMP metadata.)

In one embodiment of the invention, the last viewed view settings are stored by a word processing application when the user closes the document or quits the application. However, it will be appreciated that in order to handle application abrupt crash power failure, the application may also choose to update this information periodically at certain time intervals or on certain check points.

In another embodiment of the invention, a last modified view setting is stored. Whenever a user saves the changes or whenever user is in edit mode (or in the middle of making changes to the document) and his/her current view changes, or the user did not explicitly save his/her last set of changes and closes the document/quits the application. However, to handle application abrupt crash power failure, the application may also choose to update this information periodically at certain time intervals or on certain check points.

If the user is done with the document (step 120), the process ends in step 125.

It will be appreciated that embodiments of the invention may be used for all types of files and applications as long as the associated viewer/editor applications store this information in file's metadata or in its properties. For binary document types the view settings can easily be stored as metadata inside the files. For non-binary documents (like text files), this information can be stored via other mechanisms (such as a system registry, or associated files in the same folder like sidecar files for XMP metadata).

FIG. 2 is an illustration of an embodiment 200 of the invention. In step 130, the process starts. In step 135, if a viewer wishes to view a document from a folder that he or she has viewed or modified earlier, the system accesses the document. In step 140, for each document in the folder, an inquiry is made as to whether the document should be preprocessed to generate a thumbnail (step 145). If a decision is made in the affirmative regarding preprocessing, the last viewed setting or last modified setting of the documents stored within the metadata in the file or its properties is restored depending upon user specified file explorer setting (for example, "Tool->Folder options->View->Advanced settings->Show last viewed view, Show last modified view") in step 150. In an embodiment of the invention, step 155 generates the thumbnail for the last viewed page or last modified page spontaneously. If a decision is made in the negative regarding preprocessing, the saved thumbnails for last viewed view or last modified view are retrieved from the retrieval module of FIG. 3 (step 165) and displayed (step 160.) In an embodiment of the invention, custom settings allow users to select one of several different options namely, displaying thumbnail of the first page of the document, displaying thumbnail of the last viewed page of the document or displaying thumbnail of the last modified view of the document. In another embodiment of the invention, in non-thumbnail view of the file explorer, when a user hovers the mouse cursor over a document file path, a transparent preview of last viewed page or last edited page of the document is displayed. Once the user is done with all the files, the process ends in step 175.

Figure 3:
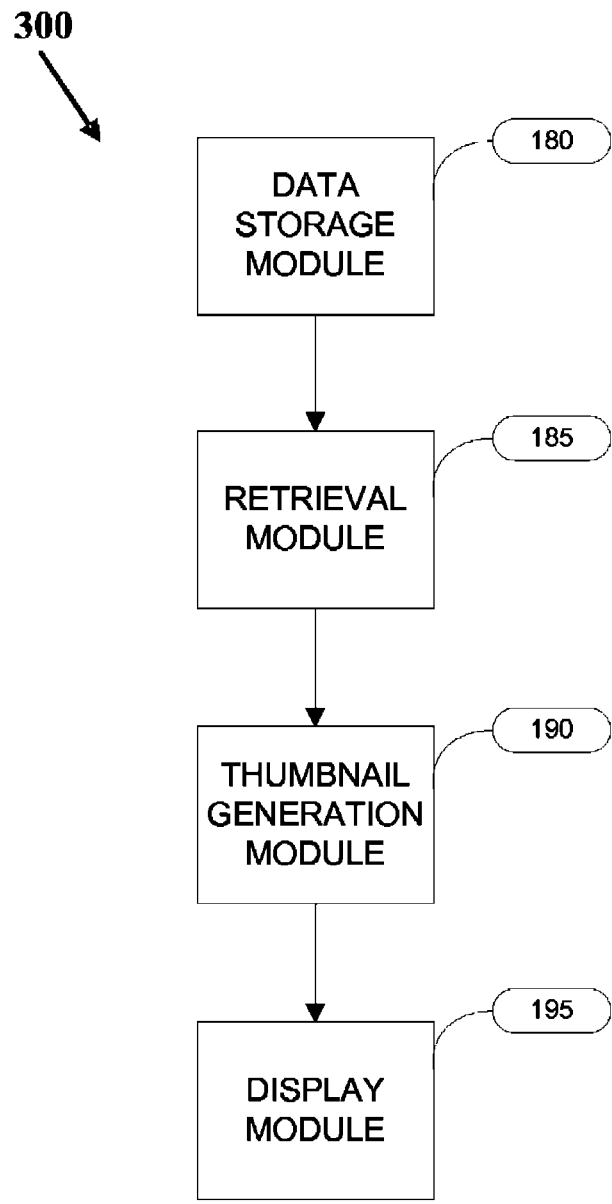
FIG. 3 is a block diagram view of an embodiment of the invention.

FIG. 3 is a block diagram view 300 of an embodiment of the invention. Thumbnail generation module 190 performs the step of preprocessing the document to generate a thumbnail of the document. The thumbnail comprises a representation of last edited page or last viewed page of the document. Retrieval Module 185 retrieves the thumbnail of the document if the thumbnail is already generated and stored, in response to an input. Data storage module 180 stores the thumbnails of a last edited page or a last viewed page of a document if the thumbnails are not already stored. Display module 195 displays the transparent preview of the last viewed page or last modified page of the document when user hovers mouse cursor over that document path in file explorer in non thumbnail mode, and also displays the thumbnail in the thumbnail view of the file explorer. The display module 195 may include, for example, the operating system Shell which displays thumbnails in the thumbnail view of the file explorer. In an alternative embodiment of the invention, the display module 195 displays a non-transparent preview of the last viewed page or last modified page of the document when a user hovers mouse cursor over that document path in a file explorer in a non thumbnail mode.

Figure 4:
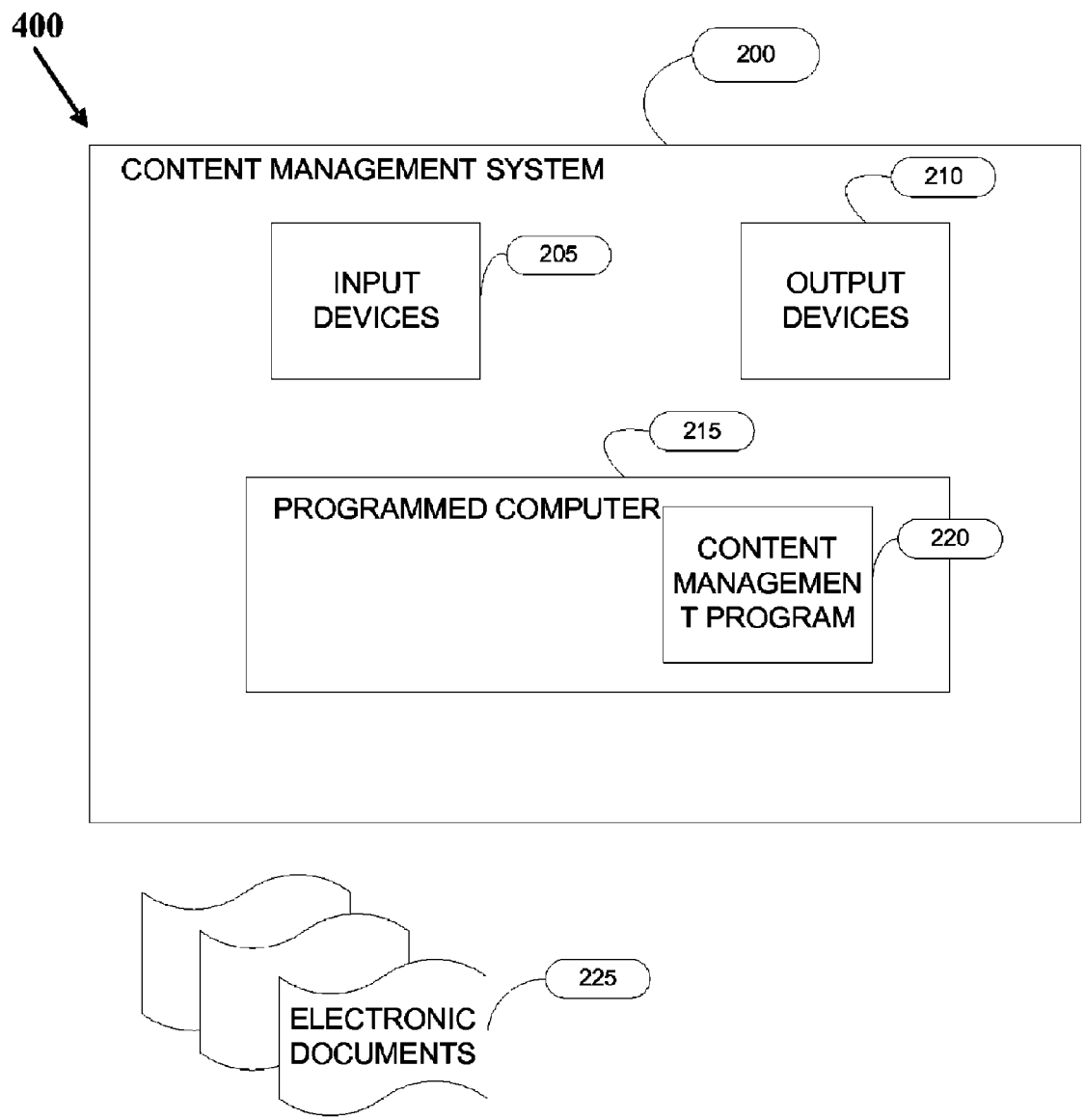
FIG. 4 illustrates an embodiment of a content management system.

The method of one embodiment of the invention is preferably performed by a content management program 220 running on a computer 215 in a content management system 200 as shown in FIG. 4, 400. The system 200 typically also has input devices 205 and output devices 210. Content management program 220 enables creating, manipulating, managing, storing and displaying electronic documents 225. Such electronic documents 225 are typically characterized by content information, such as text, images and the like, and can include for example web pages, PDF documents, electronic books or documents (including files) in other conventional formats. Users can use content management program 220 to view displayed content and thumbnails for the displayed content. The content management program 220 can be implemented as part of a web browser or a conventional content management program such as Adobe® Acrobat® or Adobe® InDesign®. An embodiment of the invention can be implemented and perform the method steps in digital electronic circuitry, or in computer hardware, firmware, software, in a machine-readable storage device, or in combinations of them.

Figure 5:
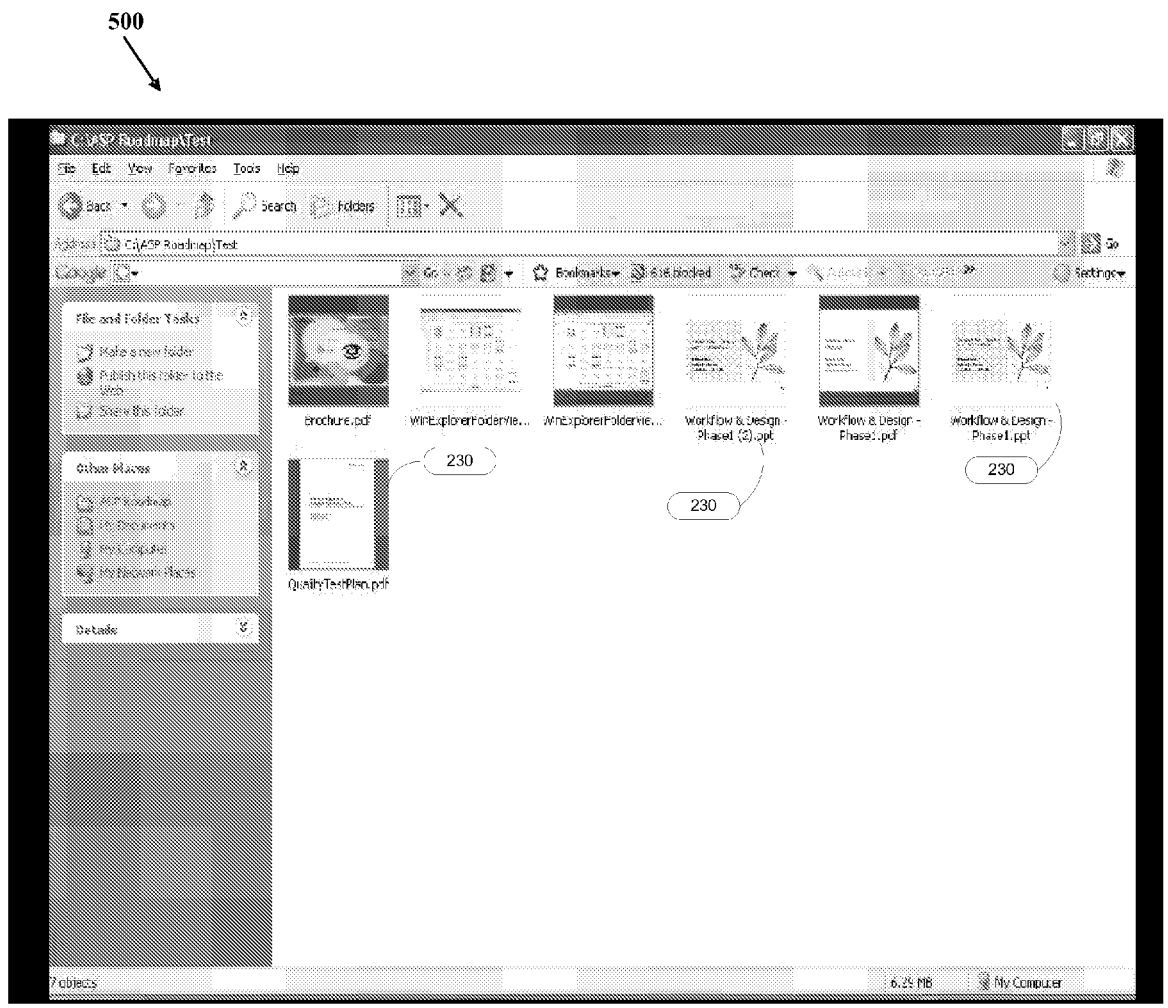
FIG. 5 is a screen shot illustrating the thumbnail view of document files of an embodiment of the invention.

FIG. 5 is a screen shot 500 illustrating the thumbnail view of document files of an embodiment of the invention. According to the embodiments of the invention, when the file browser/explorer is set to thumbnail view, the thumbnails 230 representing each document in the folder provides a pictorial representation/preview of the last viewed/edited view of the document. If user wants, he/she may configure the thumbnail view differently, for example, via file browser/explorer's radio button setting (Example: Tool->Folder options->View->Advanced settings->Show last viewed view, Show last modified view).

While embodiments of the invention are disclosed in terms of exemplary embodiments, it can be practiced in a number of ways as defined by the scope of the appended claims. Additionally, various features of embodiments of the invention can be modified in a myriad of ways to achieve the goal of analyzing the rich content of a document to automatically determine the most relevant thumbnail of the document.

We claim:

1. A computer-implemented method, comprising:
   storing, for each one of a plurality of documents, an indication of a last accessed portion of the document, wherein the last accessed portion of the document is less than the entire document; and
   displaying, simultaneously for each one of the plurality of documents, a single respective graphical representation for the document to a selected one of a plurality of users, wherein
   the single respective graphical representation for the document is a representation of only the last accessed portion of the document,
   the last accessed portion of the document depends on user-specific data that corresponds to an interaction of the selected user with the document,
   the indication of the last accessed portion of the document is stored as user-specific metadata, and different users who browse the plurality of documents see different graphical representations of a same document based on the user-specific metadata.

2. The method of claim 1, wherein the respective graphical representation for the document is a thumbnail, and further comprising:
   generating and storing the thumbnail of the document; and
   retrieving the thumbnail of the document in response to receiving a request to view a listing of the plurality of documents.

3. The method of claim 1, further comprising:
   assigning a tag to the respective graphical representation for the document, wherein the tag indicates that the respective graphical representation corresponds to the document.

4. The method of claim 1, wherein the representation of the last accessed portion of the document comprises:
   a last modified portion of the document.

5. The method of claim 1, wherein the representation of the last accessed portion of the document comprises:
   a last viewed portion of the document.

6. The method of claim 1, wherein said displaying comprises:
   displaying a transparent preview of the last accessed portion of the document in response to input which indicates placement of an input device cursor over the graphical representation for the document.

7. A non-transitory computer readable storage medium, storing program instructions executable on a computer to perform:
   storing, for each one of a plurality of documents, an indication of a last accessed portion of the document, wherein the last accessed portion of the document is less than the entire document; and
   displaying, simultaneously for each one of the plurality of documents, a single respective graphical representation for the document to a selected one of a plurality of users, wherein
      the single respective graphical representation for the document is a representation of only the last accessed portion of the document,
      the last accessed portion of the document depends on user-specific data that corresponds to an interaction of the selected user with the document,
      the indication of the last accessed portion of the document is stored as user-specific metadata, and
      different users who browse the plurality of documents see different graphical representations of a same document based on the user-specific metadata.

8. The non-transitory storage medium of claim 7, wherein the respective graphical representation for the document is a thumbnail, and further comprising program instructions executable on the computer to:
   generate and store the thumbnail of the document; and
   retrieve the thumbnail of the document in response to receiving a request to view a listing of the plurality of documents.

9. The non-transitory storage medium of claim 7, wherein the representation of the last accessed portion of the document comprises:
   a last modified portion of the document.

10. The non-transitory storage medium of claim 7, wherein the representation of the last accessed portion of the document comprises:
   a last viewed portion of the document.

11. The non-transitory storage medium of claim 7, wherein said displaying comprises:
   displaying a transparent preview of the last accessed portion of the document in response to input which indicates placement of an input device cursor over the graphical representation for the document.

12. A system, comprising:
   a memory, and a processor coupled to the memory, wherein the memory comprises program instructions executable by the processor to:
      store, for each one of a plurality of documents, an indication of a last accessed portion of the document, wherein the last accessed portion of the document is less than the entire document; and
      display, simultaneously for each one of the plurality of documents, a single respective graphical representation for the document to a selected one of a plurality of users, wherein
         the single respective graphical representation for the document is a representation of only the last accessed portion of the document,
         the last accessed portion of the document depends on user-specific data that corresponds to an interaction of the selected user with the document,
         the indication of the last accessed portion of the document is stored as user-specific metadata, and
         different users who browse the plurality of documents see different graphical representations of a same document based on the user-specific metadata.

13. The system of claim 12, wherein the respective graphical representation for the document is a thumbnail, and wherein the program instructions are further executable by the processor to:
   generate and store the thumbnail of the document; and
   retrieve the thumbnail of the document in response to an input.

14. The system of claim 12, wherein the representation of the last accessed portion of the document comprises a last modified portion of the document.

15. The system of claim 12, wherein the representation of the last accessed portion of the document comprises a last viewed portion of the document.

16. The system of claim 12, wherein said displaying comprises displaying a transparent preview of the last accessed portion of the document in response to input which indicates placement of an input device cursor over the display of the graphical representation for the document.

17. A computer-implemented method, comprising:
   storing, for each one of a plurality of documents, an indication of a last accessed portion of the document; and
   displaying to a user, simultaneously for each one of the plurality of documents, a single respective graphical representation for the document without opening the document, wherein
      the single respective graphical representation for the document is a representation of the last accessed portion of the document,
      the displaying occurs without at least one of the document or the graphical representation for the document being interacted upon by the user,
      the indication of the last accessed portion of the document is stored as user-specific metadata, and
      different users who browse the plurality of documents see different graphical representations of a same document based on the user-specific metadata.

18. The method of claim 17, wherein the graphical representation for the document is a thumbnail, and further comprising:

generating and storing the thumbnail of each document; and retrieving the thumbnail of each document in response to receiving a request to view a listing of the plurality of documents.

19. The method of claim 17, wherein the displaying occurs without the graphical representation for the document being accessed by the user.

20. The method of claim 17, wherein the graphical representation for the document is a representation of only the last accessed portion of the document.

21. The method of claim 17, wherein the representation of the last accessed portion of the document depends on user-specific data that corresponds to an interaction of the user with the document.

22. The method of claim 17, wherein the graphical representation for the document is a thumbnail image.

* * * * *

UNITED STATES PATENT AND TRADEMARK OFFICE
CERTIFICATE OF CORRECTION

PATENT NO.       : 9,286,309 B2
APPLICATION NO.  : 11/752918
DATED            : March 15, 2016
INVENTOR(S)      : Naveen Goel and Rekha Agarwal Page 1 of 1

It is certified that error appears in the above-identified patent and that said Letters Patent is hereby corrected as shown below:

In the Claims

Column 6, lines 45-46, Claim 16, please replace "over the display of the graphical" with --over the graphical--.

Signed and Sealed this
Seventeenth Day of May, 2016

Michelle K. Lee
*Director of the United States Patent and Trademark Office*